United States Patent [19]
Kohchi

[11] Patent Number: 5,585,205
[45] Date of Patent: Dec. 17, 1996

[54] SYSTEM APPARATUS FOR BATTERY SWAPPING

[75] Inventor: Akira Kohchi, Ashiya, Japan

[73] Assignee: Institute for Home Economics of Japan, Inc., Hyogo-ken, Japan

[21] Appl. No.: 234,392

[22] Filed: Apr. 26, 1994

[30] Foreign Application Priority Data

Jul. 6, 1993 [JP] Japan .................................. 5-166909

[51] Int. Cl.⁶ .................................................. H01M 2/10
[52] U.S. Cl. ........................... 429/99; 429/120; 429/123; 429/163; 180/65.1; 180/68.5
[58] Field of Search ................................. 429/123, 179, 429/163, 99, 120; 654/6 C; 180/68.5, 65.1

[56] References Cited

U.S. PATENT DOCUMENTS

| | | | |
|---|---|---|---|
| 1,065,161 | 6/1913 | Metz | 254/6 C |
| 3,983,952 | 10/1976 | McKee | 280/778 |
| 4,135,127 | 5/1979 | Klink | 180/65.1 |
| 4,216,839 | 8/1980 | Gould | 180/65.1 |
| 5,301,765 | 4/1994 | Swanson | 180/68.5 |
| 5,360,307 | 11/1994 | Schemm | 414/343 |
| 5,382,480 | 1/1995 | Molyneux | 429/120 |
| 5,392,873 | 2/1995 | Masuyama | 180/68.5 |

*Primary Examiner*—Kathryn Gorgos
*Assistant Examiner*—Brendan Mee
*Attorney, Agent, or Firm*—Price, Gess & Ubell

[57] ABSTRACT

A power pack of batteries are enclosed in an encasement for handling ease and safety of passengers riding in an electric vehicle. The encased batteries are hung underneath and outside the vehicular floor, and are air-cooled. Spent batteries are replaced with an encasement with charged ones, and the vehicle is driven onward. A special jack, provided as a part of the system, facilitates replacing operations.

17 Claims, 5 Drawing Sheets

SYSTEM APPARATUS FOR BATTERY SWAPPING

FIELD OF THE INVENTION

This invention relates to the swapping of driving power sources for electric vehicles, and in-particular to a set of apparatus through the cooperative operation of which a spent power source on board an electric vehicle is exchanged in a short time with a fully charged one available off board.

BACKGROUND OF THE INVENTION

The driving power source for electric vehicles consists of a plurality accumulator batteries whereas a battery is manufactured in such a way as to permit manual handling of it as a power pack, taken altogether, and occupies a substantial part of the total vehicular weight and bulk. Also battery capacity sets the driving range of an electric vehicle and in recharging run-down batteries, it becomes obligatory that the vehicle be rendered useless for several hours on the average. Rapid recharge systems, a recent effort to reduce this binding time, would restore in the order of several ten minutes up to a ceiling yet limited to about 60 percent of the full battery capacity and only in exchange with extremely high voltage and current to supply, with resultant hazards and shortened battery-life. Battery swapping systems, also in a recent study, have not been developed on account of the lack of practical equipment and appropriate procedures.

SUMMARY OF THE INVENTION

An object of the present invention then is to provide a set of apparatus for replacing a driving power source of an electric vehicle in a relatively easy, swift and safe manner.

It is another object of this invention to provide a power source unit for an electric vehicle which does not unduly invade the vehicular interior, exude heat and gases into the passenger compartment, and in case of collision spray the riders with the chemical contents of ruptured batteries.

It is a further object of this invention to provide a pack of batteries that is most efficient relative to its weight in aggregate, with individually emanated heat smothered and the pack temperature controllably kept down.

These objects are addressed by the present invention which provides a novel system set of apparatus operative in complement comprising a driving power source unit means having a plurality of batteries enclosed in an encasement, means affixed to the undercarriage of an electric vehicle for holding said unit exterior to the vehicle, and a jack adapted to handle the weight and the characteristics peculiar to said unit in the unit replacing operations.

Further objects, features and advantages of the invention will become apparent from the following description when taken in conjunction with the accompanying drawings.

DESCRIPTION OF THE PREFERRED EMBODIMENT

Figure 1:
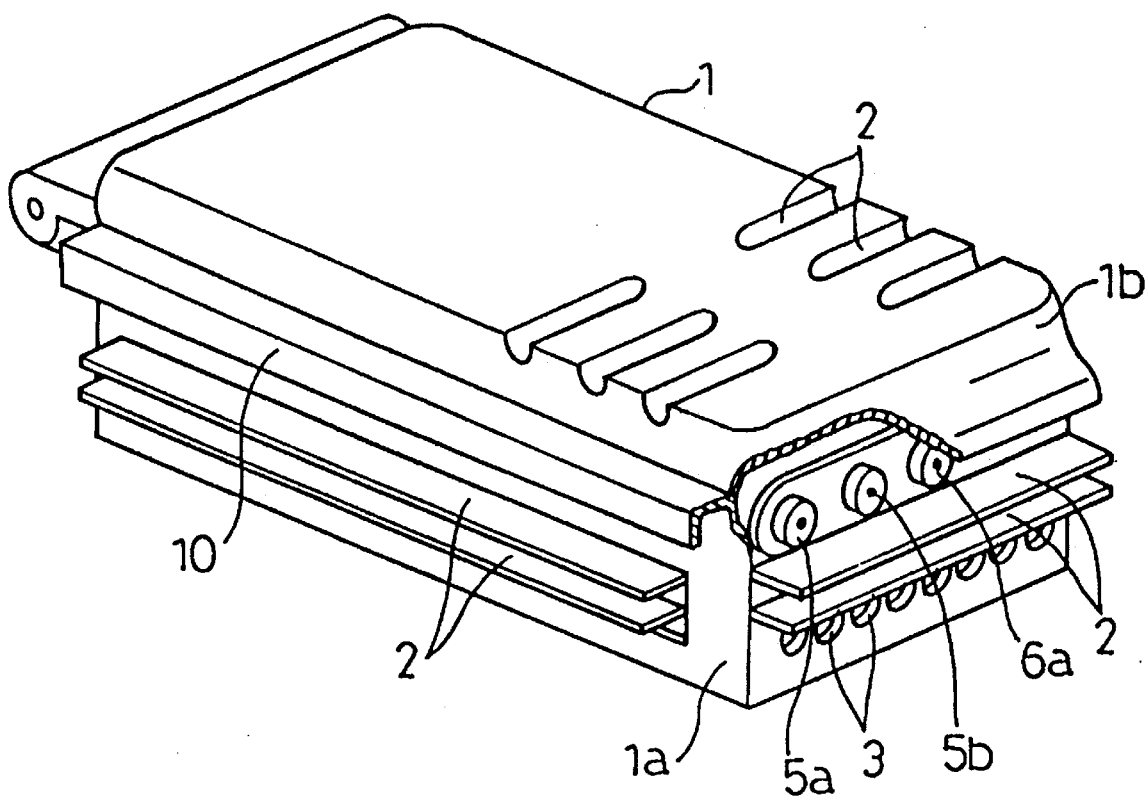
FIG. 1 illustrates a partially cutaway perspective view of a driving power source unit constructed in accordance with the invention.

As shown in FIG. 1 illustrating a perspective view, a unit encasement 1 made of a fit sturdy material comprises a lid 1b and a box body 1a having a pair of reinforced rim extensions 10 which is disposed in parallel and opposite. Protruding and indented radiation fins 2 and openings 3 are provided on said encasement for air-cooling. External terminals 5a, 5b, 6a and 6b are provided for electrical connection.

Figure 2:
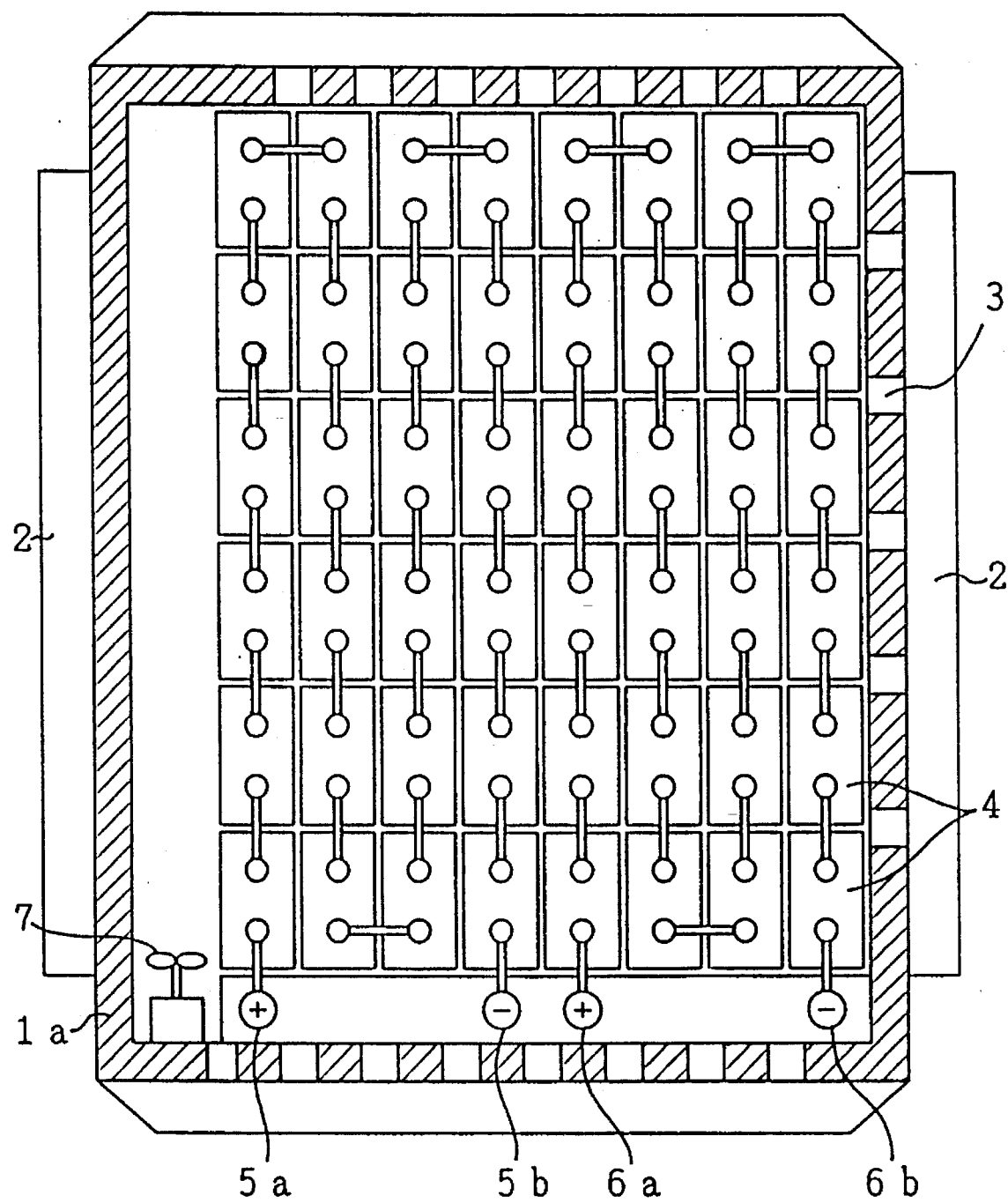
FIG. 2 illustrates a top plan view of batteries packed in the unit encasement.

FIG. 2 shows a typical interior of the box 1a wherein a plurality of batteries 4 is packed separately in two groups, each one of which is connected in series and ending at the respective pairs of said terminals 5a and 5b, and 6a and 6b, for supplying a different combination set of voltage and current to an electric vehicle through a switch (not shown) operated by the driver subject to driving conditions. The terminals can include more than one pair of anode and cathode electrodes for selectively combining an output of a supplied voltage and current, that is, either a terminal connection for meeting a particular voltage requirement or a current requirement.

Figure 3:
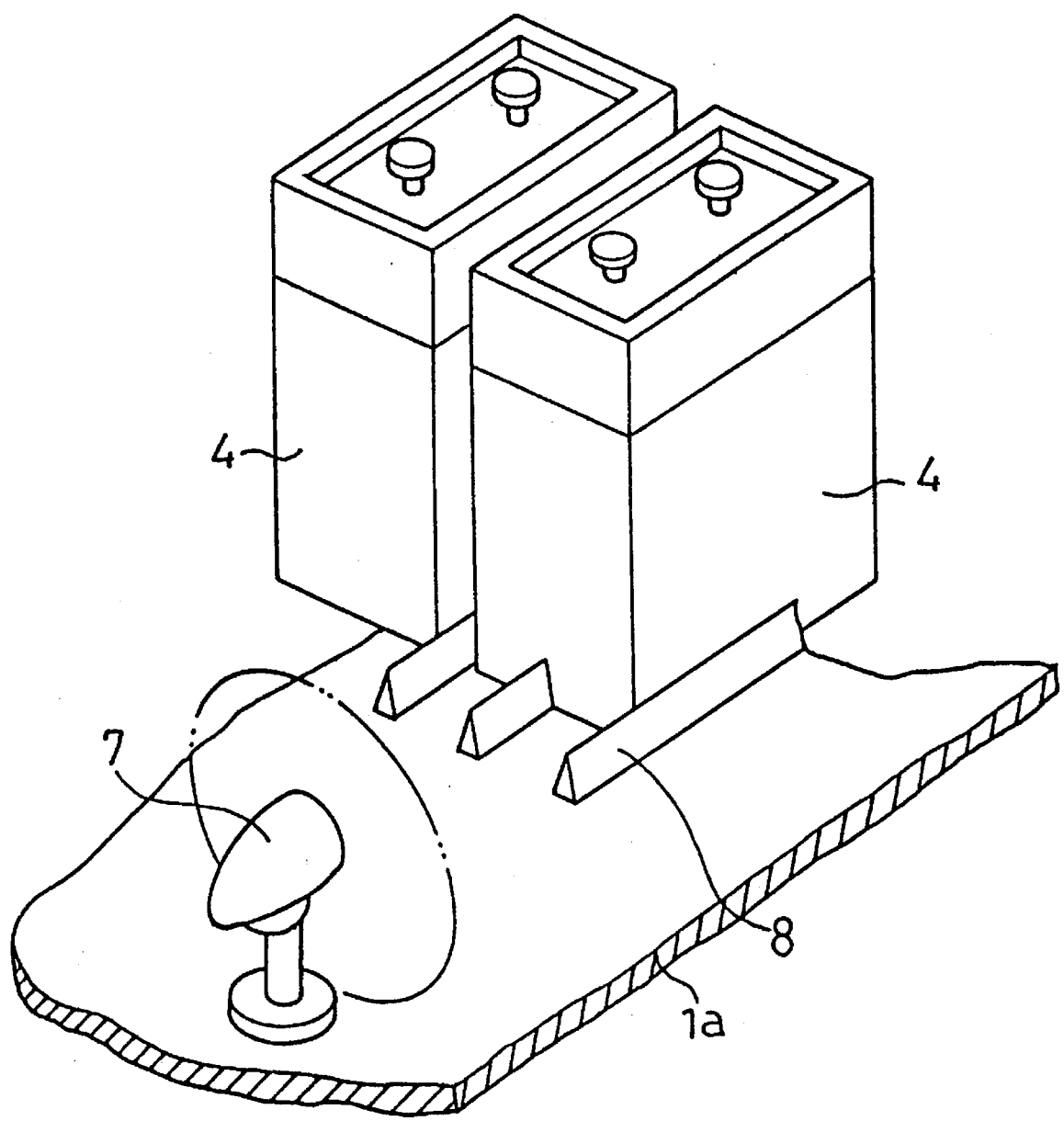
FIG. 3 illustrates a perspective view of an interior portion of the encasement.

A fan 7 provided in the interior of the body 1a together with the space secured by spacers 8 as shown in FIG. 3 ensures evenly restrained temperature for said batteries 4.

Figure 4:
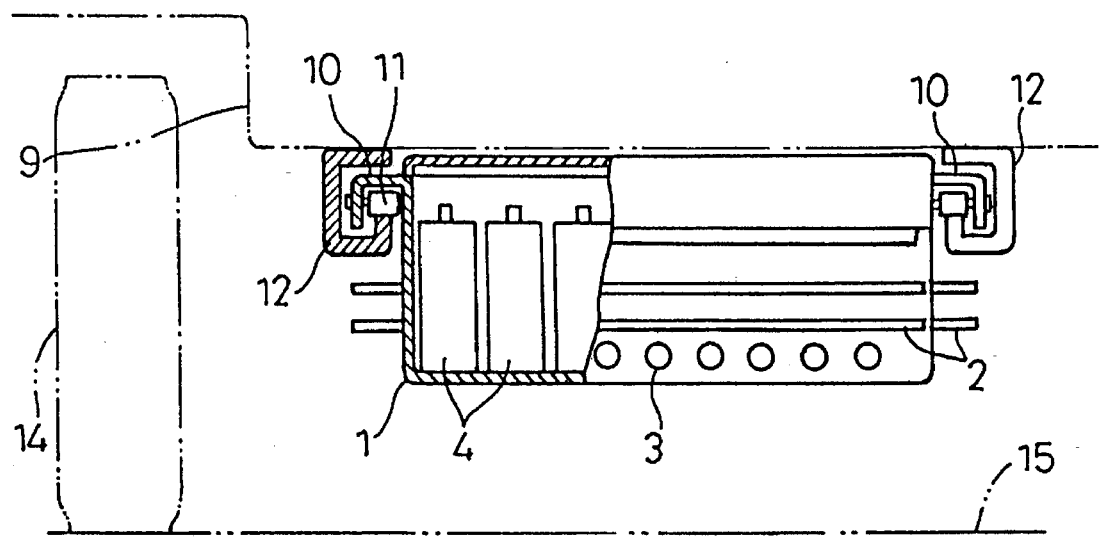
FIGS. 4 and 5 illustrate partially cutaway rear and side views respectively of the driving power source unit held at the rear-end undercarriage of an electric vehicle in accordance with the invention.
Figure 5:
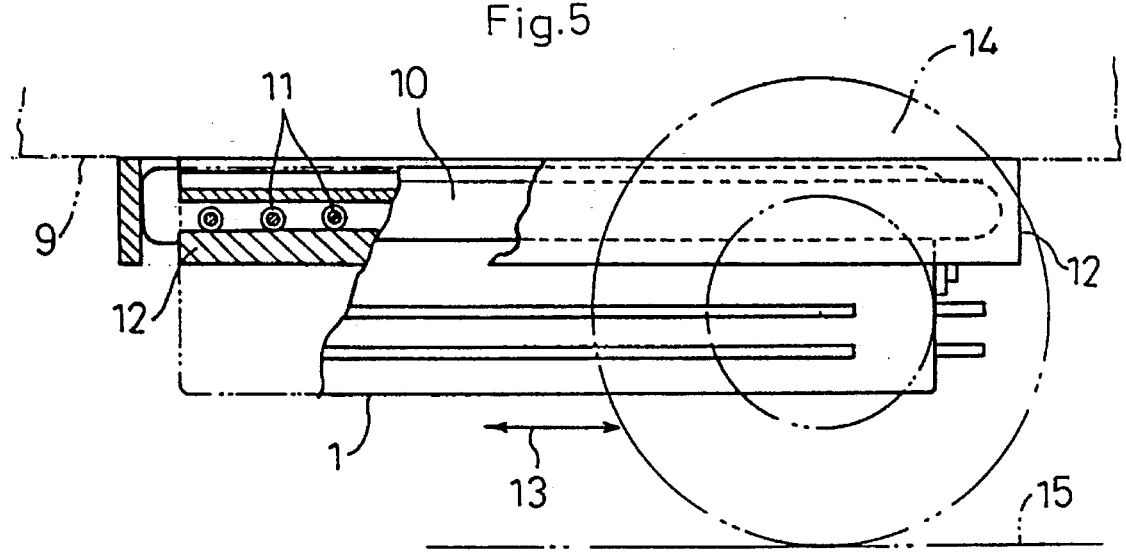

Referring to FIGS. 4 and 5 which illustrate a view of the driving power source unit installed to an electric vehicle, a pair of framed rails 12 affixed to the rear-end undercarriage 9 of said vehicle holds the unit in suspension by the extended rims 10 of said encasement 1. The rims include multiple roller-bearings 11 provided for facilitating the insertion and withdrawal therefrom, or the moving depicted by arrows 13 of said unit relative to rear wheels 14 standing stationary on the ground 15.

Although the pair of rails 12 is shown in FIGS. 4 and 5 as located in-between rear wheels 14, it will be appreciated that said rails may be placed in-between front and rear wheels. In either direction, the unit is abutted by folded rail ends (unnumbered) and then conventionally fastened at the opposite end.

Figure 6:
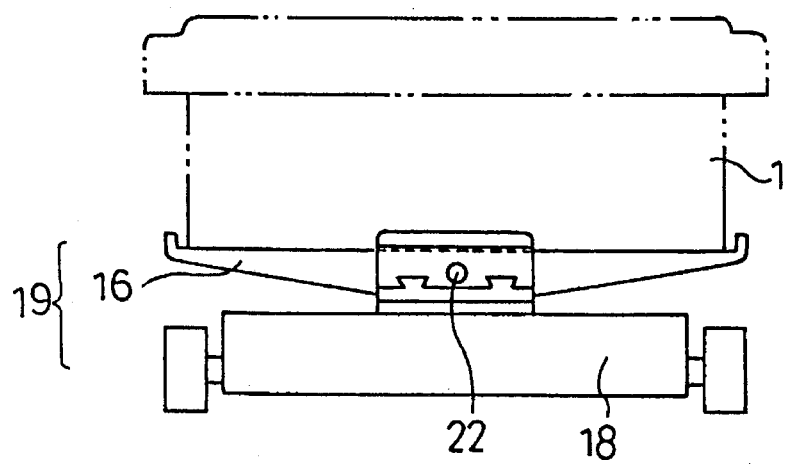
FIGS. 6 and 7 illustrate front and partially cutaway side views respectively of a jack constructed in accordance with the invention and in receipt of the driving power source unit.
Figure 7:
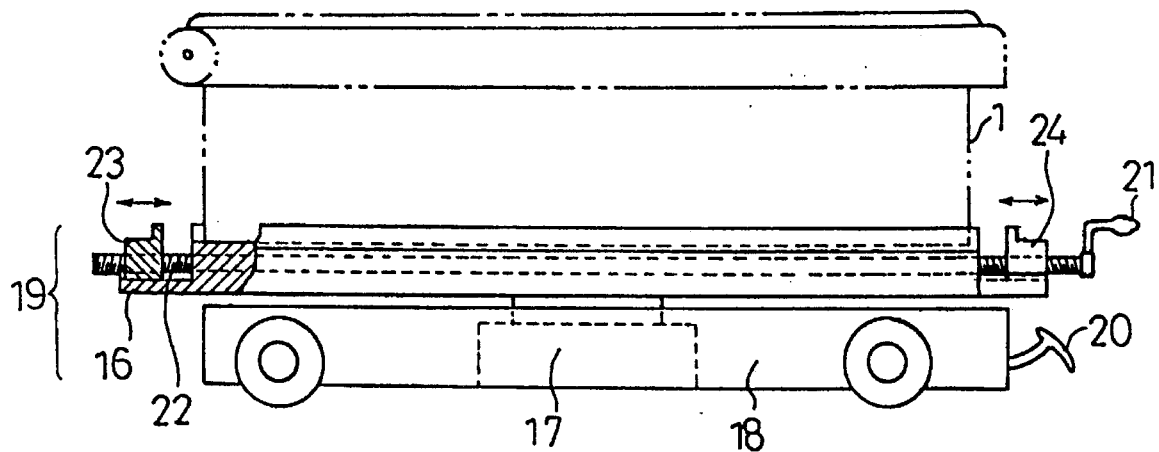

Shown in FIGS. 6 and 7 is a jack 19 constructed in accordance with the invention for handling the size and weight of said unit through a ground clearance as limited as may be surmised from FIGS. 4 and 5. A wheeled flat truck 18 houses a short-necked lifter 17 which is conventionally operated through a foot-pump 20 and is moved about by a handle bar (not shown). A flat bed 16 supported by the lifter 17 is made sufficiently wide for receiving the bottom end of the encasement 1 in its entirety. The bed 16 includes a centering device a clamping member comprising mouth pieces 23 and 24 which are screw-mounted on a shaft 22 and operated by turning a turn-knob 21.

OPERATION OF THE PREFERRED EMBODIMENT

In removing a spent driving power source unit, the vehicular rear-end is first chained or otherwise held down to the ground in compensation of changes in the vehicular weight. The jack is then wheeled in under the unit encasement and upon feeling pressure on the lifter, said centering device is operated. With either one of the mouth pieces in abutment against said encasement, the truck begins to shift as the knob is further turned, ensuring a safe center loading without the necessity of physical sighting which is difficult to perform, given the size and location of such a load. After the load has been transferred onto, the jack is pulled away, withdrawing the unit laterally from its engagement with the holding rails.

Installation takes a reverse procedure, whereby another driving power source unit recharged at a Battery Charging Station (as described in Japanese Patent Application 5-79722 filed on Apr. 6, 1993) is installed, and the vehicle goes on.

Having described but a preferred embodiment of the invention, it will be appreciated that variations can be made thereto without departing from the spirit or scope of the invention.

What is claimed is:

1. A system apparatus for swapping vehicular batteries comprising:

an encasement for enclosing a plurality of batteries for accumulating electricity in a compact manner;

means provided on said encasement for cooling said batteries;

terminals provided on said encasement and which are electrically connected with said batteries therein:

electric cables with a multi-plug connector for supplying electricity from said batteries through said terminals to an electric vehicle;

a pair of extended rims opposedly provided on said encasement; and a pair of parallel framed rails affixed to an undercarriage of said electric vehicle for receiving said rims within said frames when said rims are aligned with said pair of rails., thereby holding the encasement suspended by said rims under the undercarriage of said vehicle.

2. The system apparatus for swapping vehicular batteries as defined in claim 1 wherein said terminals for supplying electricity include more than one pair of anode and cathode electrodes to enable a selective combining of voltage and current depending upon the driving requirements of said vehicle, and the number of conductors leading out of said battery encasement and connected with said vehicle is less than the number of the electrodes.

3. The system apparatus for swapping vehicular batteries as defined in claim 3, wherein the batteries inside the encasement are switchably electrically connected in either series or parallel, or in combinations of series and parallel electrical connections, to produce different voltage and current combinations as required by the electric vehicle.

4. The invention of claim 1 wherein a plurality of roller-bearings is provided on the rims to contact said rails.

5. The invention of claim 1 wherein a plurality of roller-bearings is provided on the rails to contact said rims.

6. A system apparatus for swapping vehicular batteries comprising:

a plurality of batteries for accumulating electricity;

an encasement for enclosing said batteries in a compact manner;

means provided on said encasement for cooling said batteries;

terminals provided on said encasement and electrically connected with said batteries therein;

electric cables with a multi-plug connector for supplying electricity from said batteries through said terminals to an electric vehicle;

a pair of extended rims opposedly provided on said encasement;

a pair of framed rails affixed to an undercarriage of said electric vehicle for receiving said rims thereon when said rims are aligned with said pair of rails;

a truck member having wheels dimensioned to translate underneath the undercarriage; and a lifter assembly mounted on the truck member which is raised and lowered relative to the truck member, the lifter assembly including a self-centering clamping member for securing the encasement by two sidewalls not parallel to said rails, where the lifter assembly can lift and release an encasement from engagement with the pair of framed rails and move the encasement parallel to the rails to remove spent batteries from said vehicle and can install a new encasement on the rails with charged batteries.

7. The invention of claim 6 wherein a plurality of roller-bearings is provided on the rims to contact said rails.

8. The invention of claim 6 wherein a plurality of roller-bearings is provided on the rails to contact said rims.

9. In an electric car battery exchanging system for replacing spent batteries in an electric vehicle with recharged batteries, the improvement comprising:

a pair of spaced elongated rail members suspended beneath an undercarriage of an electric vehicle;

a plurality of enclosed hollow housing members, each having a pair of elongated side rim members cantilevered respectively from either side of the housing member and of a dimension to extend over the spaced rail members for movable support;

a plurality of batteries mounted in each of the housing members;

a track member having wheels dimensioned to translate underneath said housing members when the housing members are supported by said pair of rails; and a lifter assembly mounted on the truck member and which is raised and lowered relative to the truck member, the lifter assembly including a clamping member for securing the housing member below the side rim members where the lifter member can lift and release a housing member from the spaced rail members and move the housing member parallel to the rail members to remove spent batteries can install a new housing member on the spaced rail members with charged batteries.

10. The invention of claim 9 further including heat releasing means on each housing member.

11. The invention of claim 9 wherein the side rim members are of an inverted L cross-sectional shape.

12. The invention of claim 11 wherein the rail members are substantially a hollow rectangular shape with an aperture along one side.

13. The invention of claim 9 wherein each of the cantilevered rim members are supported by a plurality of roller members contacting said rail members.

14. In an electric car battery exchanging system for replacing spent batteries in an electric vehicle with recharged batteries, the improvement comprising:

a pair of spaced parallel supporting rail members connected to an undercarriage of an electric vehicle:

an encasement for enclosing a plurality of batteries for accumulating electricity, having a pair of rim members cantilevered, respectively, on either side of the encasement and of a dimension to extend over the spaced supporting rail members for support;

terminals provided on said encasement and electrically connected with said batteries therein;

electric cables with a multi-plug connector for supplying electricity from said batteries through said terminals to an electric vehicle;

a truck member having wheels dimensioned to translate underneath the undercarriage; and a lifter assembly mounted on the truck member which is raised and lowered relative to the truck member, the lifter asssembly including self-centering clamping members for aligning and securing said encasement where the lifter assembly can release an encasement from the spaced supporting rail members to remove spent batteries and can install a new encasement on the spaced supporting rail members with charged batteries.

15. The invention of claim 14 wherein each of the cantilevered rim members are supported by a plurality of roller members contacting said rail members.

16. An electric vehicle battery support system comprising:

an encasement for enclosing a plurality of batteries;

cooling means on the encasement for cooling the batteries;

electrical terminals on the encasement which are switchably, electrically connected to the batteries such that the batteries are connected either in series, parallel, or a combination of series and parallel, to the electrical terminals to provide the electric vehicle with a required voltage and current;

electric cables having a multi-plug connector for supplying electricity from the batteries through the electrical terminals to the electric vehicle;

two parallel rims opposedly connected to a top portion of each of the opposite sides of the encasement, the rims having a plurality of roller-bearings; and two parallel framed rails attached to an undercarriage of the electric vehicle for engaging the rims when the rims are aligned with the rails suspending the encasement under the undercarriage of the vehicle.

17. The electric vehicle support system of claim 16, wherein the plurality of roller-bearings are connected to the rails instead of to the rims.

* * * * *